(12) United States Patent
Kenemer et al.

(10) Patent No.: US 10,929,531 B1
(45) Date of Patent: Feb. 23, 2021

(54) AUTOMATED SCORING OF INTRA-SAMPLE SECTIONS FOR MALWARE DETECTION

(71) Applicant: CA, INC., San Jose, CA (US)

(72) Inventors: Keith Kenemer, Roswell, GA (US); Ryan Curtin, Atlanta, GA (US)

(73) Assignee: CA, Inc., San Jose, CA (US)

( * ) Notice: Subject to any disclaimer, the term of this patent is extended or adjusted under 35 U.S.C. 154(b) by 246 days.

(21) Appl. No.: 16/020,632

(22) Filed: Jun. 27, 2018

(51) Int. Cl.
| | | |
|---|---|---|
| *G06F 11/00* | (2006.01) | |
| *G06F 12/14* | (2006.01) | |
| *G06F 12/16* | (2006.01) | |
| *G08B 23/00* | (2006.01) | |
| *G06F 21/55* | (2013.01) | |
| *G06F 17/18* | (2006.01) | |
| *G06K 9/62* | (2006.01) | |
| *G06F 21/56* | (2013.01) | |

(52) U.S. Cl.
CPC ............ *G06F 21/554* (2013.01); *G06F 17/18* (2013.01); *G06F 21/562* (2013.01); *G06K 9/6256* (2013.01)

(58) Field of Classification Search
CPC ...... G06F 21/554; G06F 17/18; G06F 21/562; G06K 9/6256
See application file for complete search history.

(56) References Cited

U.S. PATENT DOCUMENTS

| | | | | |
|---|---|---|---|---|
| 9,773,112 B1* | 9/2017 | Rathor | ................. | G06F 21/554 |
| 2010/0192222 A1* | 7/2010 | Stokes | ................. | G06F 21/563 |
| | | | | 726/22 |
| 2012/0240231 A1* | 9/2012 | Sohn | ..................... | G06F 21/564 |
| | | | | 726/24 |
| 2012/0260340 A1* | 10/2012 | Morris | .................. | G06F 21/566 |
| | | | | 726/23 |
| 2013/0145471 A1* | 6/2013 | Richard | ................ | G06F 21/562 |
| | | | | 726/24 |
| 2017/0257384 A1* | 9/2017 | Nadeau | ................. | G06F 21/554 |
| 2017/0262633 A1* | 9/2017 | Miserendino | ......... | G06F 21/564 |
| 2018/0060576 A1* | 3/2018 | Tsao | ........................ | G06F 21/56 |
| 2018/0114018 A1* | 4/2018 | Zhang | ................... | G06F 21/562 |
| 2018/0129807 A1* | 5/2018 | Azarafrooz | ........... | G06F 21/566 |
| 2018/0300482 A1* | 10/2018 | Ll | ......................... | G06F 21/565 |

(Continued)

OTHER PUBLICATIONS

Mohaddeseh et al. (2015). A static heuristic approach to detecting malware targets. Security Comm. Networks 2015; 8:3015-3027. (Year: 2015).*

(Continued)

*Primary Examiner* — Darshan I Dhruv
(74) *Attorney, Agent, or Firm* — FisherBroyles, LLP

(57) ABSTRACT

Methods and systems are provided for detecting malware. One example method generally includes receiving a reference dataset comprising an aggregation of probability distributions of a plurality of intra-file patterns for a plurality of files of at least a first class and applying a logical query to the reference dataset to generate a template distribution with probability distributions of the plurality of intra-file patterns calculated according to one or more logical operators in the logical query. The method further includes detecting a likely presence of malware in a computer file by indicating one or more areas in the computer file based on at least a portion of the calculated probability distributions of the plurality of intra-file patterns in the template distribution.

17 Claims, 8 Drawing Sheets

(56) References Cited

U.S. PATENT DOCUMENTS

| | | | |
|---|---|---|---|
| 2018/0316694 A1* | 11/2018 | Thakar | G06F 21/56 |
| 2019/0205530 A1* | 7/2019 | Brown | G06F 21/552 |
| 2019/0228154 A1* | 7/2019 | Agrawal | G06F 21/56 |

OTHER PUBLICATIONS

Ranveer et al. (2015). Comparative Analysis of Feature Extraction Methods of Malware Detection. International Journal of Computer Applications, vol. 120—No. 5, Jun. 2015. (Year: 2015).*

Schneeweiss, W.G. (1989). "Boolean Functions With Engineering Applications and Computer Programs". Chapter 7. Springer-Verlag Berlin Heidelberg. (Year: 1989).*

Asaf Shabtai et al., "Detecting unknown malicious code by applying classification techniques on OpCode patterns," http://www.security-informatics.com/content/1/1/1, Security Informatics 2012, 22 pages.

Igor Santos et al., "N-Grams-Based File Signatures for Malware Detection," S3Lab, Deusto Technological Foundation, Bilbao, Basque Country, 4 pages.

Tony Abou-Assaleh, et al., "N-gram-based Detection of New Malicious Code," Privacy and Security Laboratory, Faculty of Computer Science, Dalhousie University, 2 pages.

* cited by examiner

FIG. 8

810 AND

| x1 | x2 | y |
|----|----|---|
| 0  | 0  | 0 |
| 0  | 1  | 0 |
| 1  | 0  | 0 |
| 1  | 1  | 1 |

812

$y = x_1 \cdot x_2$  814

820 XOR

| x1 | x2 | y |
|----|----|---|
| 0  | 0  | 0 |
| 0  | 1  | 1 |
| 1  | 0  | 1 |
| 1  | 1  | 0 |

822

$y = x_1 + x_2 - 2x_1 \cdot x_2$  824

830 OR

| x1 | x2 | y |
|----|----|---|
| 0  | 0  | 0 |
| 0  | 1  | 1 |
| 1  | 0  | 1 |
| 1  | 1  | 1 |

832

$y = x_1 + x_2 - x_1 \cdot x_2$  834

840 NOT

| x | y |
|---|---|
| 0 | 1 |
| 1 | 0 |

842

$y = 1 - x$  844

AUTOMATED SCORING OF INTRA-SAMPLE SECTIONS FOR MALWARE DETECTION

BACKGROUND

Field

Aspects of the present invention generally relate to malware of computing devices, and more particularly to detecting malware within computer files.

Description of the Related Art

Viruses, malware or other malicious code have been a frequent problem plaguing computers since the early days of computing. Over time, security software has been developed to identify and remove malicious code from computing devices. Because new malicious code is continually being written, however, authors of security software typically respond by updating and/or re-writing security software. In particular, new malicious code should be identified when it is introduced into a computing system.

Malicious code is often identified by human malware experts after investigation and review, which is a tedious process. Therefore, much attention is paid to developing new methods and systems for automatically identifying malicious code.

SUMMARY

One aspect of the present disclosure provides a method for detecting malware, at least a portion of the method being performed by one or more computing devices comprising at least one processor. The method generally includes receiving a reference dataset comprising an aggregation of probability distributions of a plurality of intra-file patterns for a plurality of files of at least a first class and applying a logical query to the reference dataset to generate a template distribution with probability distributions of the plurality of intra-file patterns calculated according to one or more logical operators in the logical query. The method further includes detecting a likely presence of malware in a computer file by indicating one or more areas in the computer file based on at least a portion of the calculated probability distributions of the plurality of intra-file patterns in the template distribution.

Another aspect of the present disclosure is a computing device. The computing device includes a processor and a memory coupled to the processor. The memory has instructions stored thereon which, when executed by the processor, perform operations for detecting malware. The operations generally include receiving a reference dataset comprising an aggregation of probability distributions of a plurality of intra-file patterns for a plurality of files of at least a first class and applying a logical query to the reference dataset to generate a template distribution with probability distributions of the plurality of intra-file patterns calculated according to one or more logical operators in the logical query. The operations further include detecting a likely presence of malware in a computer file by indicating one or more areas in the computer file based on at least a portion of the calculated probability distributions of the plurality of intra-file patterns in the template distribution.

Still another aspect of the present disclosure is a non-transitory computer-readable medium having instructions stored thereon which, when executed by a processor of a computing device, perform operations for detecting malware. The operations generally include receiving a reference dataset comprising an aggregation of probability distributions of a plurality of intra-file patterns for a plurality of files of at least a first class and applying a logical query to the reference dataset to generate a template distribution with probability distributions of the plurality of intra-file patterns calculated according to one or more logical operators in the logical query. The operations further include detecting a likely presence of malware in a computer file by indicating one or more areas in the computer file based on at least a portion of the calculated probability distributions of the plurality of intra-file patterns in the template distribution.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only exemplary aspects and are therefore not to be considered limiting of its scope, may admit to other equally effective aspects.

FIG. 8 illustrates truth tables and corresponding equations for continuous-valued logic operators, according to an aspect of the present disclosure.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

Figure 1:
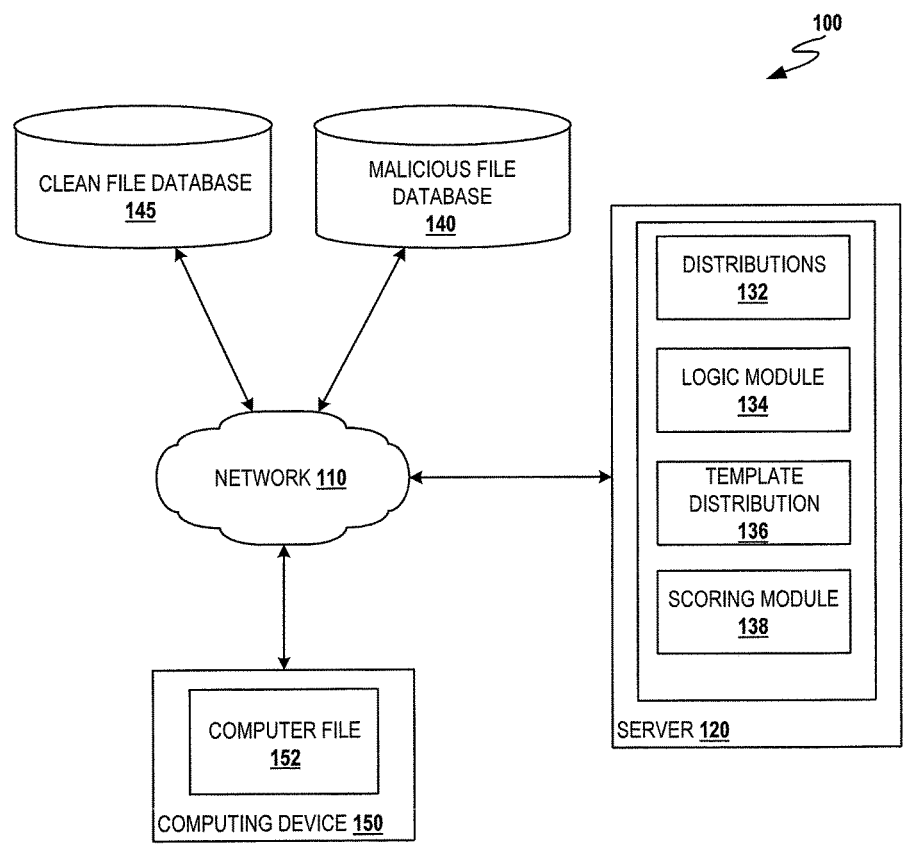
FIG. 1 is a block diagram of an example computing environment in which systems of the present disclosure may operate, according to an aspect of the present disclosure.

As described above, much attention is devoted to developing new methods and systems for automatically identifying malicious code. Existing automated methods for identifying malicious code tend to merely reduce manual analysis of potentially malicious code, but not eliminate such analysis. Such methods include automated rules-based systems and machine learning-based classifications.

Other existing methods may use pattern analysis, such as n-grams, in order to analyze potentially malicious files. However, such existing methods use pattern analysis to determine a broad category for a file and do not allow finer-grain analysis of an individual file. Thus, these existing methods again do not automate malware detection within a file and cannot be used as a tool to highlight particular areas within a file for a human malware expert to analyze. Thus systems and methods are needed that can analyze potentially malicious files at a fine resolution in order to improve automatic detection of malware within a file.

One way to improve the current functionality of pattern-based methods of identifying malware is assess the distribution and relevance of patterns within a file, or intra-file patterns. For the purposes of identifying malware, a file may also be called a sample, and an intra-file pattern may be called an intra-sample pattern. Files analyzed for malware may include, for example, Portable Executable (PE) files for use in the Windows operating system (OS). In order to make use of intra-file patterns, a set of samples of a given classification (such as a set of known malicious PE files from a malicious files database) may be analyzed for n-gram-like patterns. Generally a set of samples with a known ground truth label are analyzed for n-gram-like patterns. A known ground truth label is applied to a file which has been positively identified as having a particular classification (e.g., malicious, clean, a specific threat family). Such an analysis may be useful in identifying new samples with an initial class label of unknown.

As used herein, n-gram-like patterns generally refer to an intra-sample (e.g., intra-file) sequence of values acting as a signature for a portion of the sample. Intra-file patterns may include relatively simpler patterns like byte n-grams or more complicated patterns like hashes or quantized entropy sequences. More complicated patterns may be useful in detecting malware in files designed to avoid detection. For example, a packed (e.g., compressed) file or encrypted file may contain little useful information when evaluated with a simple byte n-gram. However, using quantized entropy sequences may reveal meaningful patterns and information in such packed or encrypted files.

Once the set of samples for the given classification is analyzed, the frequency of occurrence of intra-file patterns in the files is used to create a distribution for the given classification. That is, the distribution is an estimate of the probability distribution using frequency-of-occurrence counts (e.g., a histogram) for the samples normalized to the range of 0 to 1. For example, an intra-file pattern occurring frequently in every file of the set of malicious files may have a probability near 1 in the distribution. The distribution therefore gives a probability of appearance of identified intra-file patterns for the given classification. The distribution may therefore be used to identify intra-file patterns that occur frequently (or infrequently) in, for example, malicious files.

Using a set of logical operators, a system may be able to use distributions for a variety of sample classifications (e.g., an aggregate distribution for a set of clean files and an aggregate distribution for a set of malicious files) to create a template distribution. For example, a user may seek to identify intra-file patterns that commonly appear in malicious files, but that do not commonly appear in clean files. As described in further detail below, logical operators may be used to create a logical query such as "NOT clean AND malicious," where "NOT" and "AND" comprise logical operators, although other logical operators such as "OR" and "XOR" may be used. The template distribution generated based on that logical query would then represent a distribution of intra-file patterns that occur frequently in malicious files and do not occur frequently in clean files. Like the distributions for single classifications, a template distribution may also be normalized to the range of 0 to 1.

The template distribution may then be evaluated (e.g., scored) to identify intra-file patterns of greatest relevance. For example, n-gram-like patterns with a template distribution value close to 1 may be intra-file patterns that are most likely to occur in malicious files and to not occur in clean files. The template distribution (and accompanying scores) may then be used to indicate (e.g., highlight, score, or rank) areas of a computer file (also referred to as a test file or a "file under test") with a classification of "unidentified" (e.g., a potentially malicious file). Using the template distribution described above, if a high-score intra-file pattern is found in the computer file, it may indicate that the computer file is malware (e.g., there is a likely presence of malware in the computer file). If such an intra-file pattern is found, the area of the computer file may be highlighted for further review by a human operator (e.g., an analyst).

The method of identifying malware described above may be used to automatically identify malicious files and areas therein with greater efficiency than is possible with existing methods. Use of the current method may improve the speed of identifying malware by effectively automating a task normally performed by human experts, saving more human time than is possible with existing automated malware identification methods. In addition, by using complex intra-file patterns such as quantized entropy sequences, the current method may be able to identify patterns in malicious files not readily apparent to human experts. Further, the use of quantized values may enable the current method to catch polymorphism of malware files that may enable malware files to evade existing methods.

FIG. 1 is a block diagram of an example computing environment 100 in which systems of the present disclosure may operate, according to an aspect of the present disclosure. In particular, computing environment 100 is used to generate and score template distribution 136 using clean and malicious files (e.g., PE files). Computing environment 100 includes server 120, malicious file database 140, clean file database 145, and computing device 150, all connected via network 110.

Server 120 may be a plurality of computing devices networked together to perform various functions, although server 120 is shown here as a single device. Server 120 includes scoring engine 130, which in turn includes distributions 132, logic module 134, template distribution 136, and scoring module 138. Scoring engine 130 may be an application executing on server 120 or a series of applications executing across a distributed computing system performing the functions of server 120. Generally, scoring engine 130 creates template distribution 136 and scores template distribution 136 in response to user-specified statistical criteria (e.g., the logical query).

Distributions 132 are a plurality of aggregate probability distributions of intra-file patterns, with each individual aggregate distribution representing data for a single classification of samples. In this example, distributions 132 include a clean aggregate distribution and a malicious aggregate distribution. The clean aggregate distribution was previously created by analyzing clean files obtained from clean file database 145, creating a probability distribution for each clean file based on the occurrence of different intra-file patterns, and combining these distributions (e.g., by averaging the distribution values across all clean files for a particular intra-file pattern). The malicious aggregate distribution was previously created by analyzing malicious files obtained from malicious file database 140, creating a probability distribution for each malicious file based on the occurrence of different intra-file patterns, and combining these distributions. The sets of analyzed files (both clean and malicious files) may be referred to as the reference dataset. Thus, each of the distributions 132 represents the probability of a given intra-file pattern appearing in a particular classification of files.

Malicious file database 140 and clean file database 145 are shown as separate devices in the example of FIG. 1, but in other examples the files stored by malicious file database 140 and clean file database 145 may be stored within a single database. Additionally, malicious file database 140 and clean file database 145 are shown as separate from server 120, but in other examples, malicious file database 140 and/or clean file database 145 may be storage devices within server 120, or may be directly connected to server 120. If so, files accessed from malicious file database 140 or clean file database 145 may not travel over network 110 to server 120.

Logic module 134 is used to create template distribution 136. Logic module 134 receives user-specified statistical criteria and generates logical queries based on the user-specified statistical criteria. Generally, the logical queries include logical operators (such as "AND," "OR," "XOR," and "NOT") and use distributions (e.g., the aggregate distributions from the reference dataset) as operands. Thus, logic module 134 creates template distribution 136 by performing various logical operations on distributions 132. By using logic module 134, the server 120 can create a template distribution 136 that satisfies specified logical queries and represents occurrence rates of the intra-file patterns associated with the specific queries, effectively filtering the multiple distributions. For example, template distribution 136 may be a result of the logical query "NOT clean AND malicious." Such a template distribution 136 may be used to identify intra-file patterns which are commonly found only in malicious files.

Scoring module 138 scores the intra-file patterns based on the probabilities determined in template distribution 136. For example, scoring module 138 may rank the intra-file patterns (according to their corresponding distribution values in template distribution 136) in descending order to identify the most relevant intra-file patterns to the logical query used to construct template distribution 136. Scoring module 138 may also apply one or more thresholds to the template distribution or to ranked intra-file patterns to filter out a set of intra-file patterns not relevant enough to search for. The process of ranking and applying a threshold to template distribution 136 may be called scoring.

Once template distribution 136 has been scored, scoring engine 130 may use the results to identify a likely presence of malware within files with a classification of "unknown," such as files previously unknown to scoring engine 130. In this example, scoring engine 130 may receive computer file 152 from computing device 150 for analysis. Computing device 150 may be a part of a security system along with server 120, or may be an end-user device with locally-executing security agent which identifies computer file 152 and transmits computer file 152 to server 120 for analysis. Computer file 152 is a file (such as an executable PE file) unknown to the security system or the security agent, and thus, should be analyzed for any malware or malicious code before execution. That is, computer file 152 is a potentially malicious file.

Scoring engine 130 may search computer file 152 for intra-file patterns indicated by template distribution 136 after scoring. If an intra-file pattern indicated by template distribution 136 after scoring (meaning an intra-file pattern with high relevance to the user-specified statistical criteria used to create template distribution 136) is found in computer file 152, scoring engine 130 may highlight the area of computer file 152 including the high-relevance intra-file pattern. Generally, the presence of a high-relevance intra-file pattern means that there is a likely presence of malware within computer file 152. This is true assuming template distribution 136 was generated to identify malware.

Figure 2:
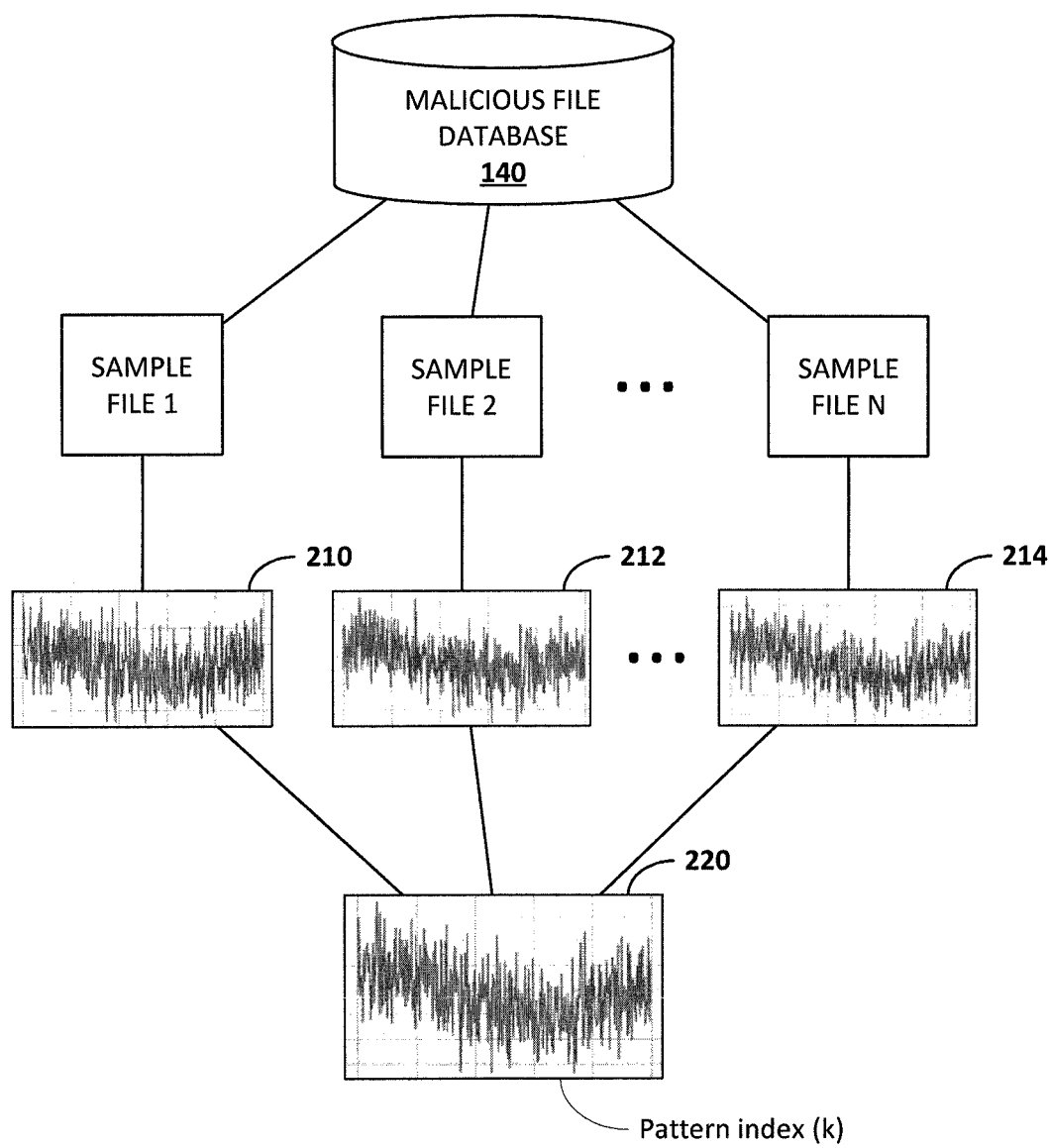
FIG. 2 is a conceptual illustration of the creation of a malicious aggregate distribution, according to an aspect of the present disclosure.

FIG. 2 is a conceptual illustration of the creation of malicious aggregate distribution 220, according to an aspect of the present disclosure. Malicious aggregate distribution 220 is generally created using a set of malicious files. Here, malicious aggregate distribution 220 is created using N sample files from malicious file database 140. Although three sample files are shown in this example for simplicity, malicious aggregate distribution 220 may be created based on any number of sample files.

Each of the N sample files has a corresponding sample distribution. Sample file 1 corresponds to sample distribution 210, sample file 2 corresponds to sample distribution 212, and sample file N corresponds to sample distribution 214. Sample distributions 210, 212, and 214 represent the occurrence of different intra-file patterns within the sample files. That is, a point high on a sample distribution corresponds to an intra-file pattern which occurs frequently in the corresponding sample file. Generally, each sample file is analyzed for a distribution of intra-file patterns. The intra-file patterns of each sample file x has a probability distribution $P_x[k]$, where k indexes a particular intra-file pattern. Thus, $P_x[k]$ is equal to the probability of the $k^{th}$ intra-file pattern appearing within the $x^{th}$ sample.

In this example, sample distribution 210 corresponds to $P_1[k]$, sample distribution 212 corresponds to $P_2[k]$, and sample distribution 214 corresponds to $P_N[k]$. $P_1[k]$, $P_2[k]$, and $P_N[k]$ may be aggregated together to create malicious aggregate distribution 220, which is represented as $P_M[k]$. $P_M[k]$ represents the probability of occurrence of intra-file pattern k across the samples aggregated together. $P_M[k]$ may be normalized to values ranging from 0 to 1, where 1 represents the intra-file pattern occurring most frequently in the sample files.

Because the sample files used to create malicious aggregate distribution 220 were malicious files, malicious distribution 220 may be used as a good estimate of the most commonly appearing intra-file patterns in malicious files. A similar method may be used to create other types of distributions, such as a clean distribution used as a good estimate of the most commonly appearing intra-file patterns in clean files. Other distributions may be packed distributions for packed or compressed sample files, or threat family distributions for files known to belong to a particular threat family of malicious code. Such distributions may be used to create template distributions, and thus, to identify a likely presence of malware in files.

Figure 3A:
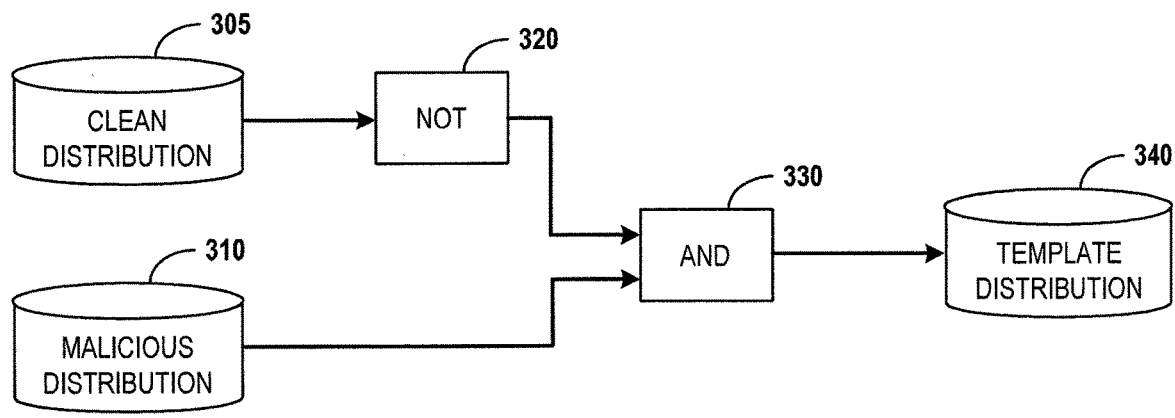
FIGS. 3A and 3B are conceptual illustrations of the creation of an example template distribution, according to an aspect of the present disclosure.
Figure 3B:
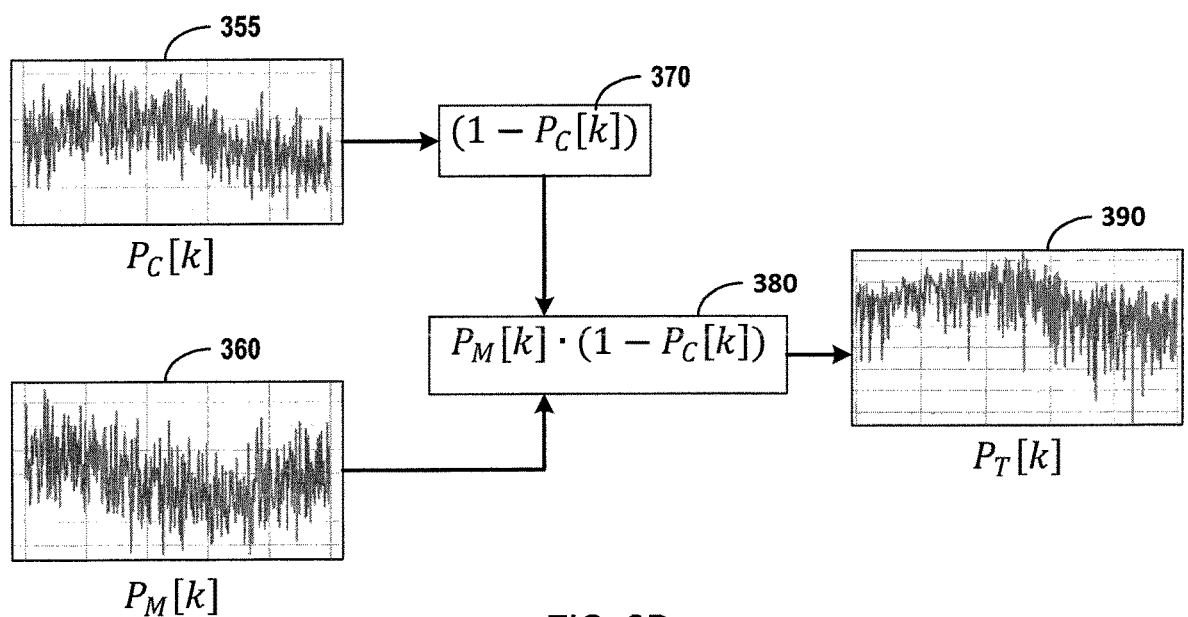

FIGS. 3A and 3B are conceptual illustrations of the creation of an example template distribution, according to an aspect of the present disclosure. FIG. 3A illustrates the creation of template distribution 340. Template distribution 340 is created by performing a logical operation. Clean aggregate distribution 305 and malicious aggregate distribution 310 are used as operands, and boxes 320 and 330 are logical operators. The particular logical operator being performed is "NOT clean AND malicious." As shown, clean aggregate distribution 305 is fed to logical operator NOT 320. The result, an inverse of clean aggregate distribution 305, is fed, along with malicious aggregate distribution 310, to logical operator AND 330. The result is template distribution 340, which is itself a combination of malicious aggregate distribution 310 and the inverse of clean aggregate distribution 305.

FIG. 3B illustrates the creation of template distribution 390 using the same logical operations as shown in FIG. 3A. FIG. 3B however, illustrates the use of probabilistic logical expressions. Probabilistic logical expressions may also be called continuous-valued logic, as compared to Boolean logic. Distribution 355 is a clean aggregate distribution represented by $P_C[k]$ and corresponding to clean aggregate distribution 305. Distribution 360 is an malicious aggregate distribution represented by $P_M[k]$ and corresponding to malicious aggregate distribution 310.

Probabilistic logical operator 370 is a formulaic representation of logical operator NOT 320 for use with probabilistic calculations. In general, the probabilistic logical operator NOT is performed by the function $(1-x)$ where x is the probability distribution operated on. In this example, because $P_C[k]$ is used as the operand, the specific use of probabilistic logical operator 370 is $(1-P_C[k])$. Generally, the use of a probabilistic logical operator NOT results in an inverse distribution of the distribution used as the operand. For example, an intra-file pattern k with a high value in $P_C[k]$ will have a low value in $(1-P_C[k])$.

Probabilistic logical operator 380 is a formulaic representation of logical operator AND 330. In general, the probabilistic logical operator AND is performed by the function $(x_1 \cdot x_2)$ where $x_1$ and $x_2$ are the probability distributions operated on. In this example, because $P_M[k]$ and $(1-P_C[k])$ are used as the operands, the specific use of probabilistic logical operator 380 is $P_M[k] \cdot (1-P_C[k])$. Probabilistic logical operator AND results in a probability distribution of values from 0 to 1, with values closer to 1 representing more relevant points (e.g., intra-file patterns frequently appearing in both operand distributions). An intra-file pattern k with a high value in both $P_M[k]$ and $(1-P_C[k])$ will have a relatively high value in $P_M[k] \cdot (1-P_C[k])$. For example, for index 1 if $P_M[1]=0.9$ and $(1-P_C[1])=0.85$, then $P_M[1]$ AND $(1-P_C[1])=0.765$. Conversely, an intra-file pattern k with a high value in $P_M[k]$ but a low value in $(1-P_C[k])$, or vice versa, will have a relatively low value in $P_M[k] \cdot (1-P_C[k])$. For example, for index 1 if $P_M[1]=0.9$ and $(1-P_C[1])=0.1$, then $P_M[1]$ AND $(1-P_C[1])=0.09$.

The result of probabilistic logical operators 370 and 380 is template distribution 390, represented by $P_T[k]$. The creation of template distribution 390 involved the probabilistic logical operators NOT and AND. Other probabilistic logical operators include OR and XOR. The probabilistic logical operator OR is performed by the function $(x_1+x_2-x_1 \cdot x_2)$ where $x_1$ and $x_2$ are the probability distributions operated on. Probabilistic logical operator OR results in a probability distribution with higher values representing points in both or either operand distributions. The probabilistic logical operator XOR is performed by the function $(x_1+x_2-2(x_1 \cdot x_2))$ where $x_1$ and $x_2$ are the probability distributions operated on.

Figure 4:
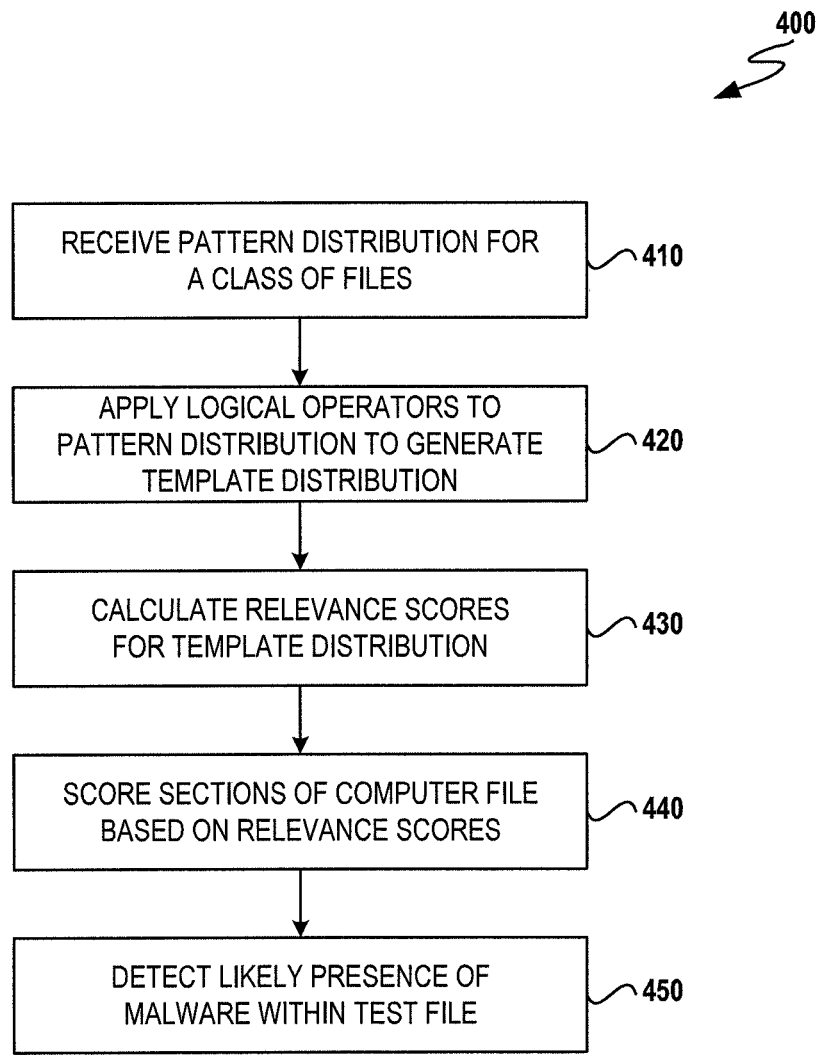
FIG. 4 is a flow chart of an example method for using intra-file patterns to detect malware, according to an aspect of the present disclosure.

FIG. 4 is a flow chart of an example method 400 for scoring relevance of intra-file patterns to detect malware, according to an aspect of the present disclosure. Method 400 may be performed by security software executing on a server in a security system, and may include the functionality of a scoring engine such as scoring engine 130 of FIG. 1. Method 400 begins at 410, where the security software receives a pattern distribution for a class of files. For example, the pattern distribution may be a malicious distribution representing the probability of occurrence of intra-file patterns within malicious files. Such a pattern distribution may have been previously generated by the security software, may be received by the security software from a separate computer over a network connection, or may be retrieved from a storage or database device attached to the server on which the security software executes.

At 420, the security software applies logical operators to the pattern distribution to generate a template distribution. The applied logical operators may be based on user-specified statistical criteria received by the security software. In general, the logical operators may be used to generate a template distribution meeting user demand for distributions used to identify relevant intra-file patterns. For example, if a user is attempting to identify intra-file patterns that occur frequently in clean files but infrequently in malicious files, the logical query "clean AND NOT malicious may be used." Other, more complicated logical queries are also possible. For example, if a user is attempting to identify intra-file patterns that occur frequently in malicious files and are also frequently found in one of two known types of threat families, the logical query "malicious AND threat_A OR threat_B" may be used.

At 430, the security software calculates relevance scores for the template distribution created at 420. In general, the relevance scores indicate which intra-file patterns are most closely related to the user-specified statistical criteria. To calculate the relevance scores, the intra-file patterns, may be sorted or ranking from highest to lowest. Additionally, a threshold may be applied to the intra-file patterns to filter out intra-file patterns with insufficient relevance to the user-specified statistical criteria. For example, if a user is attempting to identify intra-file patterns that occur frequently in clean files but infrequently in malicious files a highly relevant intra-file pattern would be a pattern occurring frequently in malicious files and infrequently in clean files. If a user is attempting to identify intra-file patterns that occur frequently in malicious files and are also frequently found in one of two known threat families, highly relevant intra-file patterns would be patterns occurring frequently in malicious files and also occurring frequently in files of either or both threat families.

At 440, the security software scores sections of a computer file based on the relevance scores. The computer file may be received by the security software for analysis and the identification of any possible malicious code within the computer file. In general, the security software analyzes the computer file looking for highly relevant intra-file patterns as determined by the relevance scores.

At 450, the security software detects a likely presence of malware within the computer file. If the user-specified statistical criteria are constructed with the goal of identifying malicious code, the resulting relevance scores identify intra-file patterns relevant to that goal. If such an intra-file pattern is detected within the computer file, it means that the computer file has a high probability of including malicious code. In such a case, the security software may highlight the section of the computer file containing the high-relevance intra-file pattern. Such highlighting may assist a user operator of the security software in analyzing the computer file.

After detecting a likely presence of malware in the computer file, the security software may take corrective action with respect to the security software. Such corrective action may be called a security action and is generally intended to protect a computing device from the malware within the computer file. A security action may be one of several different types of action performed. For example a security action may include blocking a download of the computer file onto other computing devices. Another security action may involve warning a user of a computing device about the computer file, such as through a graphical user interface (GUI) presented on a display of the user's computing device. Additionally or alternatively, a security action may entail alerting an administrator to the potential maliciousness of the computer file.

Another security action may include preventing the computer file from performing any action on a computing device. Such prevention may be implemented if the computer file is detected to include malware after installation of the computer file on the computing device. Other possible security actions include quarantining the computer file (such as in a quarantine folder of a computing device) or deleting the computer file from a computing device entirely.

Figure 5:
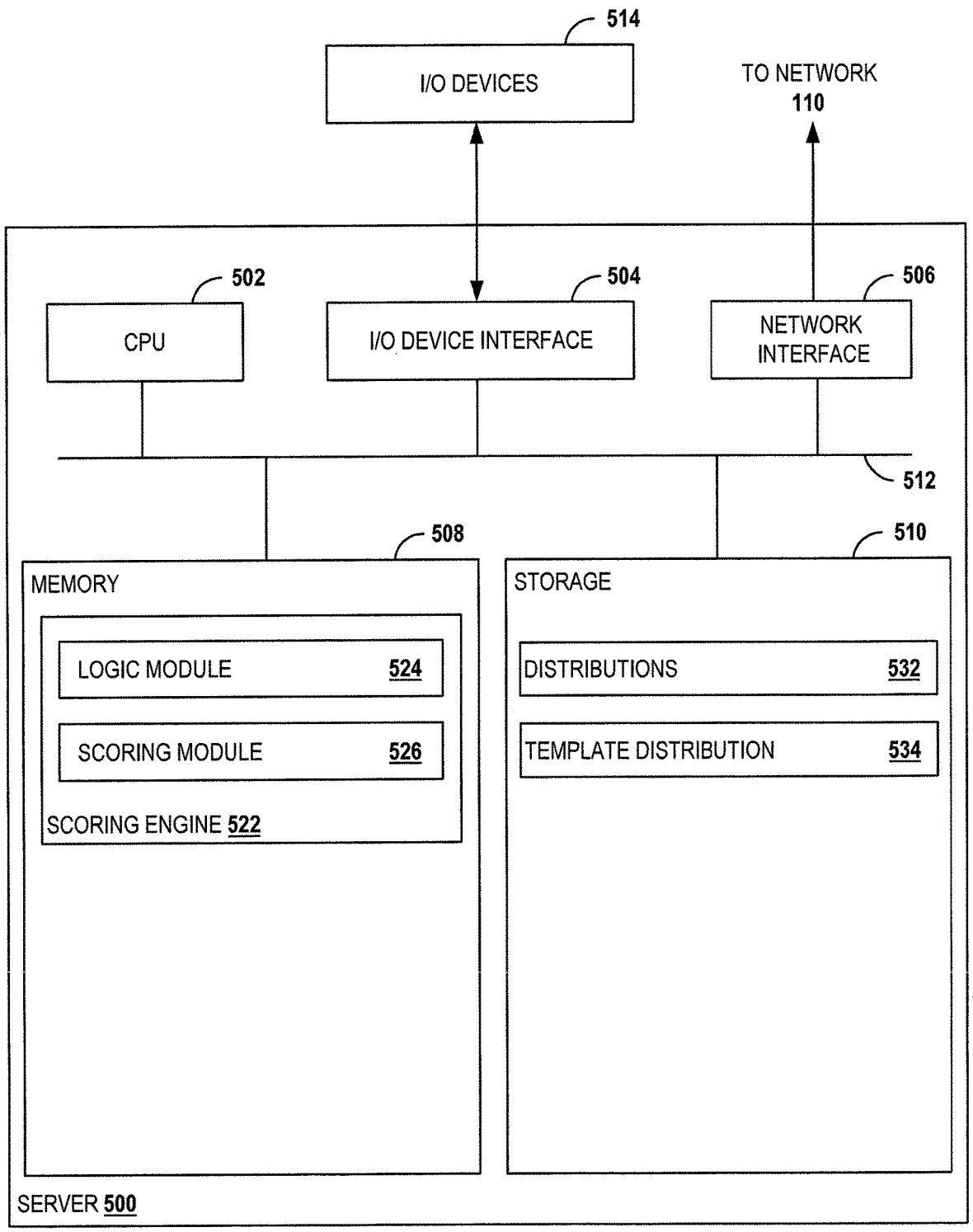
FIG. 5 is a block diagram of an example server, according to an aspect of the present disclosure.

FIG. 5 illustrates an example server 500 according to one aspect. As shown, the server 500 includes, without limitation, a central processing unit (CPU) 502, one or more input/output (I/O) device interfaces 504, which may allow for the connection of various I/O devices 514 (e.g., keyboards, displays, mouse devices, pen input, etc.) to server 500, network interface 506, memory 508, storage 510, and an interconnect 512.

The CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. The CPU 502 is included to be representative of a single CPU, multiple CPUs, a single CPU having multiple processing cores, and the like. The I/O device interface 504 may provide an interface for capturing data from one or more input devices integrated into or connected to the server 500, such as keyboards, mice, touchscreens, and so on. The memory 508 may represent a random access memory (RAM), while the storage 510 may be a solid state drive, for example. Although shown as a single unit, the storage 510 may be a combination of fixed and/or removable storage devices, such as fixed drives, removable memory cards, network attached storage (NAS), or cloud-based storage.

As shown, the memory 508 includes a scoring engine 522, which in turn includes a logic module 524 and a scoring module 526. The scoring engine 522 may analyze files of known classifications to create distributions 532, shown as stored in storage 510. Logic module 524 may manipulate distributions 532 using logical operators to create template distribution 534, also shown as stored in storage 510. Scoring module 526 may score template distribution 534 to identify relevant intra-file patterns within template distribution 534. Scoring engine 522 may be an application executed based on instructions stored in the storage 510. Such instructions may be executed by the CPU 502.

As shown, the storage 510 includes distributions 532 and template distribution 534. Both distributions 532 and template distribution 534 may be created by CPU 502 executing scoring engine 522 and stored in storage 510 following execution.

Figure 6:
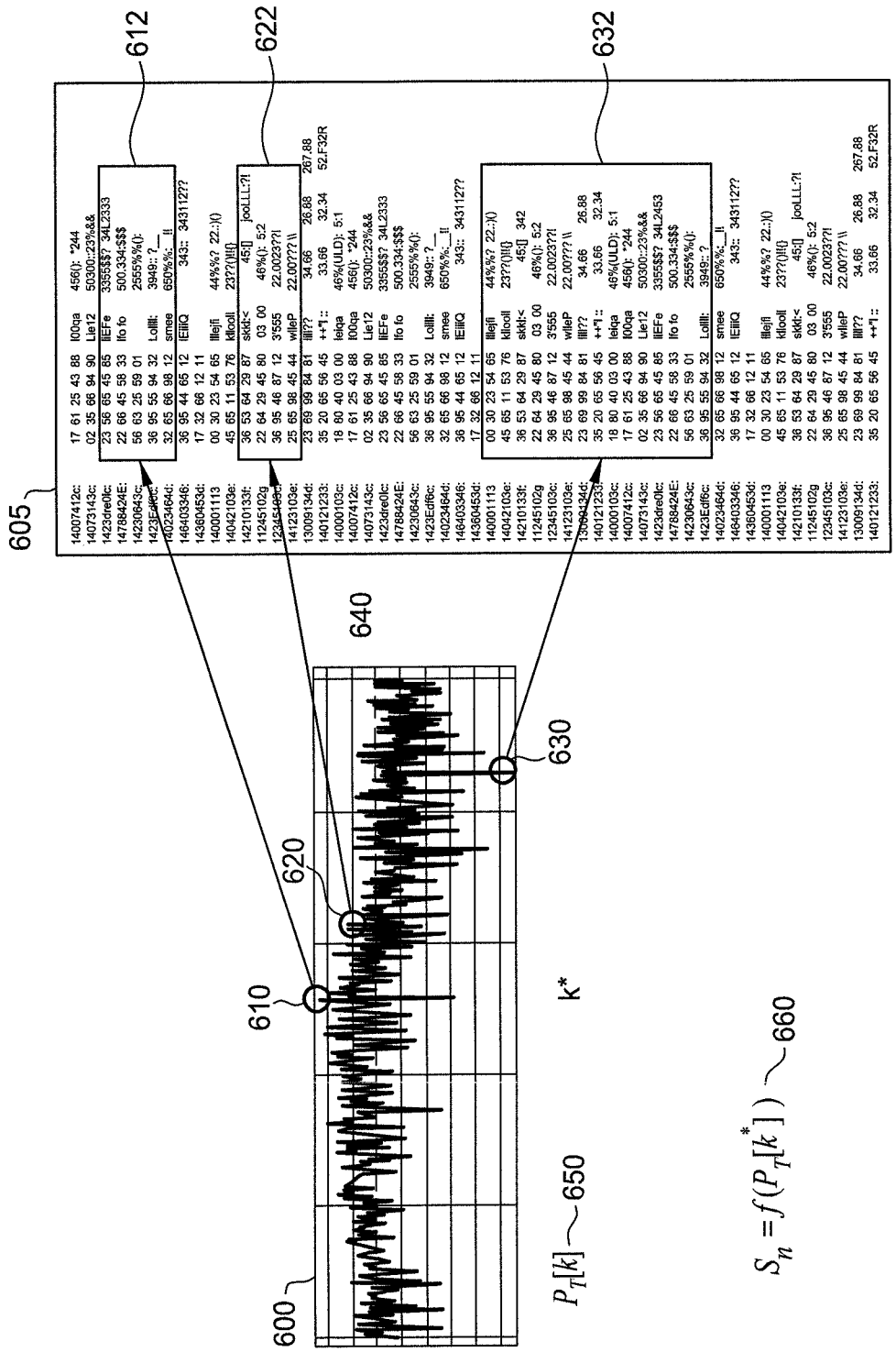
FIG. 6 is a conceptual illustration of scoring different areas in a computer file based on probabilities of intra-file patterns in an example template distribution, according to an aspect of the present disclosure.

FIG. 6 is a conceptual illustration of scoring different areas in a computer file 605 based on probabilities of intra-file patterns in template distribution 600, according to an aspect of the present disclosure. Template distribution is represented by expression 650, $P_T[k]$, where k indexes the $k^{th}$ intra-file pattern in template distribution 600. Template distribution 600 may have been created by a logical query based on user-specified statistical criteria. For example, the methods described with respect to FIGS. 3A and 3B may have been used to create template distribution 600. Template distribution 600 can be used to analyze computer files. In this example template distribution 600 is used to analyze computer file 605.

Three points in template distribution 600 are marked, corresponding to intra-file pattern 610, intra-file pattern 620, and intra-file pattern 630. Dashed line 640 is shown representative of a threshold applied to template distribution 600. In general, the threshold may be applied to filter the intra-file patterns indexed in template distribution 600 to the intra-file patterns most relevant to the logical query used to create template distribution 600. Points in template distribution 600 above line 640 are above the threshold, and points below line 640 are below the threshold. As shown, intra-file patterns 610 and 620 are above the threshold and so are considered relevant to the analysis performed on computer file 605.

Intra-file patterns 610, 620, and 630 can be found within computer file 605. In particular, intra-file 610 is shown in box 612, intra-file pattern 620 is shown in box 622, and intra-file pattern 630 is shown in box 632. Because intra-file patterns 610 and 620 are above line 640, intra-file patterns 610 and 620 are above the threshold applied to template distribution 600, and so, the sections of computer file 605 corresponding to intra-file patterns 610 and 620 are considered relevant to the analysis of computer file 605. Consequently, boxes 612 and 622 may be highlighted for further review by a human expert (e.g., to determine whether these areas contain malware). Conversely, because intra-file pattern 630 is below line 640, intra-file pattern 630 is below the threshold, and the corresponding section of computer file 605 may be ignored for analysis purposes.

In other aspects of the present disclosure, rather than highlighting sections of computer file 605, color coding may be used to display information about computer file 605. For example, the high relevance sections of computer file 605 (boxes 612 and 622) may be shown in red, while low relevance sections of computer file 605 (box 632) may be shown in blue. Other colors, combinations of colors, or other meanings for the given colors may be utilized.

Expression 660 represents a mapping function for use in scoring the intra-file patterns of template distribution 600 (e.g., for use in generating relevance scores). Expression 660 is $S_n = f(P_T[k^*])$, where $P_T[k^*]$ is the template distribution at index k, f( ) represents an example translation function, and $S_n$ is a score distribution indexed by intra-file pattern n. In particular, f( ), may be any function capable of translating values while maintaining the relative positioning of those values, such as a square root function or a squaring function.

Figure 7:
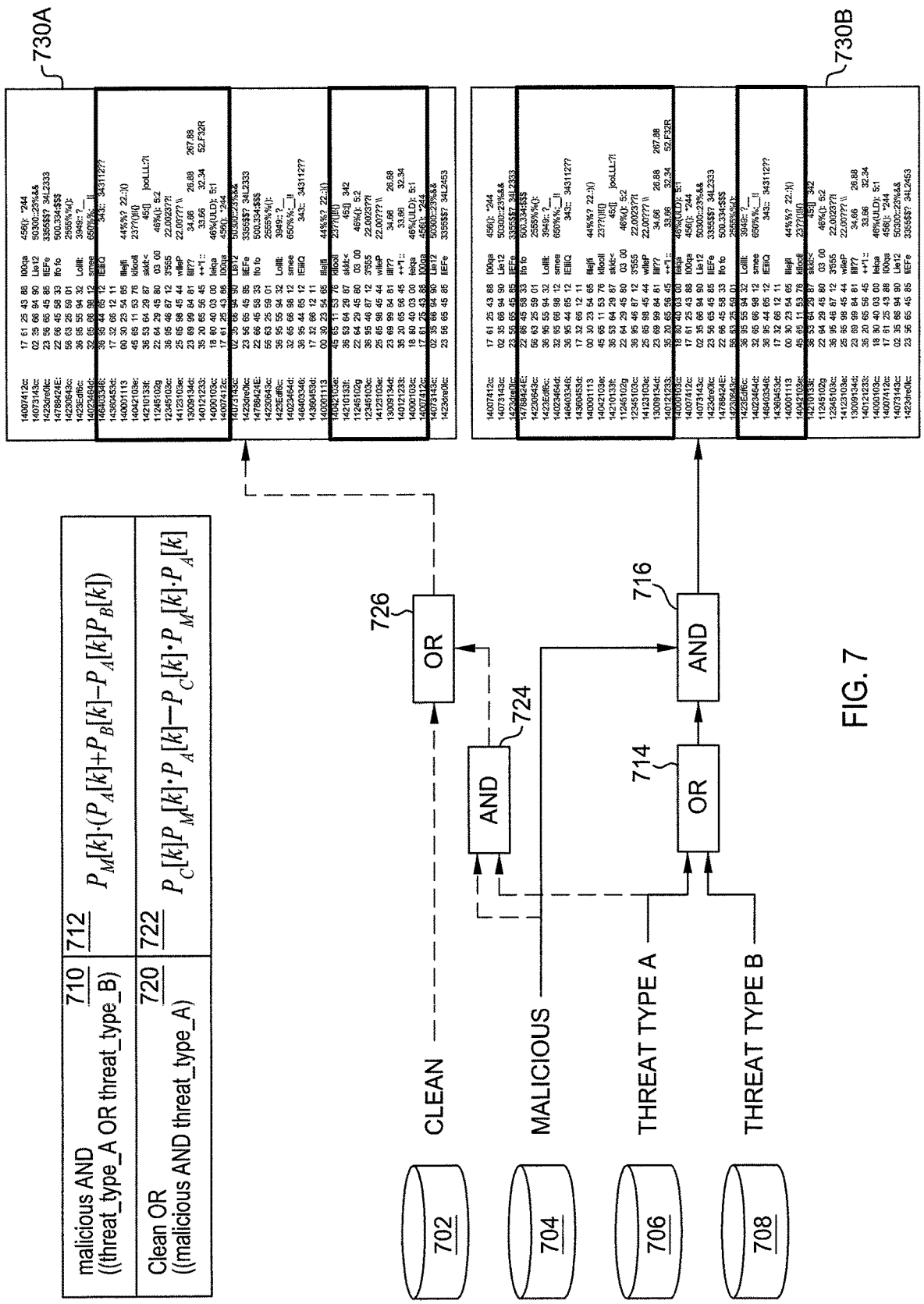
FIG. 7 is a conceptual illustration of the creation of different template distributions from the same reference dataset based on relatively more complex logical queries, according to an aspect of the present disclosure.

FIG. 7 is a conceptual illustration of the creation of different template distributions from the same aggregate distributions (the same reference dataset) based on relatively more complex logical queries 710 and 720, according to an aspect of the present disclosure. The different template distributions may function as different filters and, hence, may highlight different areas of the same computer file. Logical query 710 is "malicious AND (threat_type_A OR threat_type_B)," which generally can be used to locate intra-file patterns that are commonly in found in malicious files and also commonly found in either files of threat family A or threat family B. Logical query 710 can be represented as expression 712, $P_M[k] \cdot (P_A[k] + P_B[k] - P_A[k]P_B[k])$. $P_M[k]$ is an expression of malicious aggregate distribution 704, $P_A[k]$ is an expression of threat family A distribution 706, and $P_B[k]$ is an expression of threat family B aggregate distribution 708.

A template distribution is created based on logical query 710 using aggregate distributions 704, 706, and 708 as well as logical operators 714 and 716. First, aggregate distributions 706 and 708 are fed to logical operator OR 714. As described above with respect to FIG. 3B, logical operator OR is defined by the expression $x_1+x_2-(x_1 \cdot x_2)$. In this example, the result of logical operator OR 714 is $P_A[k]+P_B[k]-P_A[k]P_B[k]$.

Next, the result of logical operator OR 714 and aggregate distribution 704 are fed to logical operator AND 716. As described above with respect to FIG. 3B, logical operator AND is defined by the expression $x_1 \cdot x_2$. In this example, the result of logical operator AND 714 is expression 712, $P_M[k] \cdot (P_A[k]+P_B[k]-P_A[k]P_B[k])$.

Logical query 720 is "clean OR (malicious AND threat_type_A)," which generally can be used to locate intra-file patterns that are commonly found in clean files or that are found in both malicious files and files of threat family A. Logical query 720 can be represented as expression 712, $P_C[k]+(P_M[k] \cdot P_A[k])-P_C[k] \cdot (P_M[k] \cdot P_A[k])$. $P_C[k]$ is an expression of clean aggregate distribution 702.

A second template distribution is created based on logical query 720 using aggregate distributions 702, 704, and 706 as well as logical operators 724 and 726. First, aggregate distributions 704 and 706 are fed to logical operator AND 724, which as described above is defined by the expression $(x_1 \cdot x_2)$. In this example, the result of logical operator AND 724 is $P_M[k] \cdot P_A[k]$.

Next, the result of logical operator AND 724 and aggregate distribution 702 are fed to logical operator OR 726. As described, logical operator OR is defined by the expression $x_1+x_2-(x_1 \cdot x_2)$. In this example, the result of logical operator AND 726 is expression 722, $P_C[k]+(P_M[k] \cdot P_A[k])-P_C[k] \cdot (P_M[k] \cdot P_A[k])$.

Both of the template distributions created by logical queries 710 and 720 may be used to analyze computer files for various features. For example, both templates are shown being used to analyze a single computer file. Scored computer file 730A represents the computer file analyzed by the template distribution of logical query 710 while scored computer file 730B represents the computer file analyzed by the template distribution of logical query 720. As shown, the sections highlighted in both versions of the computer file are different, owing to the different logical queries used to create the template distributions.

FIG. 8 illustrates various logic operators, according to an aspect of the present disclosure. FIG. 8 provides a comparison of a continuous-valued logic expression for each logical operator and a Boolean logic truth table also corresponding to each logical operator.

Logical operator AND 810 is shown next to both Boolean logic truth table 812 and continuous-valued logic expression 814. Boolean logic truth table 812 is an expression of all possible inputs and corresponding outputs for the logical operator AND. Unlike continuous-valued logical operators, Boolean logical operators only take discrete (e.g., integer) values as input. In general, Boolean logical operators that take two values as input (such as AND, OR, and XOR) can take four different combinations of values, (0, 0), (0, 1), (1, 0) and (1, 1). For AND, as shown in truth table 812, the input (1, 1) results in 1 while the other input combinations result in 0.

Continuous-valued logic expression 814 is an equation used to calculate logical operator AND 810. Continuous-valued logic expression 814, is, as shown, $y=x_1 \cdot x_2$. Continuous-valued logic expression 814 is the continuous counterpart to Boolean logic truth table 812. In particular, all inputs given to continuous-valued logic expression 814 result in the same output as those same inputs given to truth table 812. For example, (1, 1) given as input to truth table 812 is 1, while input (1, 1) given as input to continuous-valued logic expression 814 evaluates to $y=1 \cdot 1=1$.

Logical operator OR 820 is shown next to both Boolean logic truth table 822 and continuous-valued logic expression 824. Truth table 822 is an expression of all possible inputs and corresponding outputs for the discrete logical operator OR. For OR, as shown in truth table 822, the input (0, 0) results in 0 while the other input combinations result in 1.

Continuous-valued logic expression 824 is an equation used to calculate logical operator OR 820. Continuous-valued logic expression 824, is, as shown, $y=x_1+x_2-x_1 \cdot x_2$. Continuous-valued logic expression 824 is the continuous counterpart to Boolean logic truth table 822. In particular, all inputs given to continuous-valued logic expression 814 result in the same output as those same inputs given to truth table 822. For example, (0, 1) given as input to truth table 822 is 1, while input (0, 1) given as input to continuous-valued logic expression 824 evaluates to $y=0+1-0 \cdot 1=1$.

Logical operator XOR 830 is shown next to both Boolean logic truth table 832 and continuous-valued logic expression 834. Truth table 832 is an expression of all possible inputs and corresponding outputs for the Boolean logical operator XOR. For XOR, as shown in truth table 832, the inputs (0, 0) and (1, 1) result in 0 while the inputs (1, 0) and (0, 1) result in 1.

Continuous-valued logic expression 834 is an equation used to calculate logical operator OR 830. Continuous-valued logic expression 834 is, as shown, $y=x_1+x_2-2x_1 \cdot x_2$. Continuous-valued logic expression 834 is the continuous counterpart to truth table 832. In particular, all inputs given to continuous-valued logic expression 834 result in the same output as those same inputs given to truth table 832. For example, (1, 1) given as input to truth table 832 is 0, while input (1, 1) given as input to continuous-valued logic expression 834 evaluates to $y=1+1-2(1 \cdot 1)=2-2=0$.

Logical operator NOT 840 is shown next to both Boolean logic truth table 842 and continuous-valued logic expression 844. Truth table 842 is an expression of all possible inputs and corresponding outputs for the logical operator NOT. Unlike OR, XOR, or AND, logical operator NOT takes only a single value as input. For NOT, as shown in truth table 842, the input (0) results in 1, while the input (1) results in 0.

Continuous-valued logic expression 844 is an equation used to calculate logical operator NOT 840. Continuous-valued logic expression 844, is, as shown, $y=1-x$. Continuous-valued logic expression 844 is the continuous counterpart to truth table 842. In particular, all inputs given to continuous-valued logic expression 844 result in the same output as those same inputs given to Boolean logic truth table 842. For example, (1) given as input to truth table 842 is 0, while input (1) given as input to continuous-valued logic expression 844 evaluates to $y=1-1=0$.

One advantage of continuous-valued logical operations is that these operations can be used on non-discrete (e.g., non-whole or decimal) values. In particular, this allows continuous-valued logical operations to be used on values between 0 and 1, such as probability distribution values. This allows aspects of the present disclosure to perform more complicated logical queries on intra-file pattern distributions (such as those shown in FIG. 7) than would be possible without continuous-valued logical operators.

One aspect of the present disclosure provides a method for detecting malware, at least a portion of the method being performed by one or more computing devices comprising at least one processor. The method generally includes receiving a reference dataset comprising an aggregation of probability distributions of a plurality of intra-file patterns for a plurality of files of at least a first class and applying a logical query to the reference dataset to generate a template distribution with probability distributions of the plurality of intra-file patterns calculated according to one or more logical operators in the logical query. The method further includes detecting a likely presence of malware in a computer file by indicating one or more areas in the computer file based on at least a portion of the calculated probability distributions of the plurality of intra-file patterns in the template distribution.

According to some aspects, the method further includes, in response to detecting the presence of malware in the computer file, performing a security action to protect the one or more computing devices from the malware.

According to some aspects, the security action comprises one or more of: blocking a download of the computer file, warning a user about the computer file, preventing the computer file from performing any actions on the one or more computing devices, alerting an administrator to the potential maliciousness of the computer file, quarantining the computer file, and deleting the computer file.

According to some aspects, each of the indicated areas has a pattern corresponding to one of the plurality of intra-file patterns.

According to some aspects, the indicating comprises scoring the one or more areas of the computer file based on a mapping function translating the calculated probability distributions of the plurality of intra-file patterns in the template distribution into scores. For some aspects, the indicating further comprises color-coding the one or more areas of the computer file based on the scores.

According to some aspects, the indicating further comprises determining at least one set of intra-file patterns corresponding to at least one set of the scores having a value above at least one threshold; searching the computer file to find one or more patterns matching elements in the at least one set of intra-file patterns; and highlighting the found patterns as the one or more areas in the computer file.

According to some aspects, the method further includes applying at least one threshold to the template distribution to determine the at least the portion of the calculated probability distributions of the plurality of intra-file patterns in the template distribution, wherein the indicating comprises: searching the computer file to find patterns matching intra-file patterns having calculated probability distributions in the template distribution above the threshold; and highlighting the found patterns as the one or more areas in the computer file.

According to some aspects, the method further includes: applying another logical query to the reference dataset to generate another template distribution with other probability distributions of the plurality of intra-file patterns calculated according to one or more other logical operators in the other logical query; and indicating one or more other areas in the computer file based on the calculated other probability distributions of the plurality of intra-file patterns in the other template distribution.

According to some aspects, the reference dataset comprises one or more other aggregations of probability distributions of the plurality of intra-file patterns for one or more other pluralities of files of at least a second class. In this case, applying the logical query to the reference dataset to generate the template distribution may entail applying the logical query to the aggregation of probability distributions for the at least the first class and to the one or more other aggregations of probability distributions for the at least the second class.

According to some aspects, the one or more logical operators comprise at least one of: AND, wherein AND is performed by multiplying two operands; OR, wherein OR is performed by adding the two operands and subtracting a product of the two operands; XOR, wherein XOR is performed by adding the two operands and subtracting twice the product of the two operands; or NOT, wherein NOT is performed by subtracting a single operand from a value of 1.

According to some aspects, the first class or the second class is one of malicious, clean, a type of threat family, or packed.

According to some aspects, the intra-file patterns comprise n-grams of quantized entropy sequences.

According to some aspects, the method further includes receiving statistical criteria and generating the logical query based on the statistical criteria.

Note, descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

In the preceding, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, aspects, and advantages are merely illustrative and are not considered elements or limitations of the appended claims except where explicitly recited in a claim. Likewise, reference to "the invention" shall not be construed as a generalization of any inventive subject matter disclosed herein and shall not be considered to be an element or limitation of the appended claims except where explicitly recited in a claim.

Aspects of the present disclosure may take the form of an entirely hardware aspect, an entirely software aspect (including firmware, resident software, micro-code, etc.) or an aspect combining software and hardware aspects that may all generally be referred to herein as a "circuit," "module," or "system." Furthermore, aspects of the present disclosure may take the form of a computer program product embodied in one or more computer-readable medium(s) having computer-readable program code embodied thereon.

Any combination of one or more computer-readable mediums may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples of a computer-readable storage medium include: an electrical connection having one or more wires, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the current context, a computer-readable storage medium may be any tangible medium that can contain or store a program.

While the foregoing is directed to aspects of the present disclosure, other and further aspects of the disclosure may be devised without departing from the basic scope thereof, and the scope thereof is determined by the claims that follow.

What is claimed is:

1. A method for detecting malware, at least a portion of the method being performed by one or more computing devices comprising at least one processor, comprising:
    receiving a reference dataset comprising a first aggregation of probability distributions of a plurality of intra-file patterns for a plurality of files of at least a first class and a second aggregation of probability distributions of the plurality of intra-file patterns for a plurality of files of at least a second class, wherein the first aggregation of probability distributions includes a probability for each of the plurality of intra-file patterns of occurring in the plurality of files of at least the first class and the second aggregation of probability distributions includes a probability for each of the plurality of intra-file patterns of occurring in the plurality of files of at least the second class;
    applying, to the reference dataset, a logical query that combines the first class with the second class by using one or more probabilistic logical operators to combine, for each of the plurality of intra-file patterns, the respective probability from the first aggregation with the respective probability from the second aggregation to generate a template distribution with probability distributions of the plurality of intra-file patterns calculated according to the one or more probabilistic logical operators in the logical query such that the template distribution includes a probability for each of the plurality of intra-file patterns of occurring in the combined first and second class;
    applying at least one threshold to the template distribution to determine at least a portion of the calculated probability distributions of the plurality of intra-file patterns in the template;
    detecting a likely presence of malware in a computer file by indicating one or more areas in the computer file based on the portion of the calculated probability distributions of the plurality of intra-file patterns in the template distribution; and
    in response to detecting the presence of malware in the computer file, performing a security action to protect the one or more computing devices from the malware.

2. The method of claim 1, wherein the security action comprises one or more of:
    blocking a download of the computer file;
    warning a user about the computer file;
    preventing the computer file from performing any actions on the one or more computing devices;
    alerting an administrator to the potential maliciousness of the computer file;
    quarantining the computer file; and
    deleting the computer file.

3. The method of claim 1, wherein each of the indicated areas has a pattern corresponding to one of the plurality of intra-file patterns.

4. The method of claim 1, wherein the indicating comprises scoring the one or more areas of the computer file based on a mapping function translating the calculated probability distributions of the plurality of intra-file patterns in the template distribution into scores.

5. The method of claim 4, wherein the indicating further comprises color-coding the one or more areas of the computer file based on the scores.

6. The method of claim 1, wherein the indicating comprises:
    searching the computer file to find patterns matching intra-file patterns having calculated probability distributions in the template distribution above the threshold; and
    highlighting the found patterns as the one or more areas in the computer file.

7. The method of claim 1, further comprising:
    applying another logical query to the reference dataset to generate another template distribution with other probability distributions of the plurality of intra-file patterns calculated according to one or more other logical operators in the other logical query; and
    indicating one or more other areas in the computer file based on the calculated other probability distributions of the plurality of intra-file patterns in the other template distribution.

8. The method of claim 1, wherein:
    the reference dataset comprises one or more other aggregations of probability distributions of the plurality of intra-file patterns for one or more other pluralities of files of at least a third class; and
    applying the logical query to the reference dataset to generate the template distribution comprises applying the logical query to the aggregation of probability distributions for the at least the first class and second class and to the one or more other aggregations of probability distributions for the at least the third class.

9. The method of claim 1, wherein the one or more probabilistic logical operators comprise at least one of:
    AND, wherein AND is performed by multiplying two operands;
    OR, wherein OR is performed by adding the two operands and subtracting a product of the two operands;
    XOR, wherein XOR is performed by adding the two operands and subtracting twice the product of the two operands; or
    NOT, wherein NOT is performed by subtracting a single operand from a value of 1.

10. The method of claim 1, wherein the first class or the second class is one of malicious, clean, a type of threat family, or packed.

11. The method of claim 1, wherein the intra-file patterns comprise n-grams of quantized entropy sequences.

12. The method of claim 1, further comprising:
    receiving statistical criteria; and
    generating the logical query based on the statistical criteria.

13. A computing device comprising:
    a processor; and
    a memory having instructions stored thereon which, when executed by the processor, perform operations for detecting malware, the operations comprising:
        receiving a reference dataset comprising a first aggregation of probability distributions of a plurality of intra-file patterns for a plurality of files of at least a first class and a second aggregation of probability distributions of the plurality of intra-file patterns for a plurality of files of at least a second class, wherein the first aggregation of probability distributions includes a probability for each of the plurality of intra-file patterns of occurring in the plurality of files of at least the first class and the second aggregation of probability distributions includes a probability for each of the plurality of intra-file patterns of occurring in the plurality of files of at least the second class;

applying, to the reference dataset, a logical query that combines the first class with the second class by using one or more probabilistic logical operators to combine, for each of the plurality of intra-file patterns, the respective probability from the first aggregation with the respective probability from the second aggregation to generate a template distribution with probability distributions of the plurality of intra-file patterns calculated according to the one or more probabilistic logical operators in the logical query such that the template distribution includes a probability for each of the plurality of intra-file patterns of occurring in the combined first and second class;

applying at least one threshold to the template distribution to determine at least a portion of the calculated probability distributions of the plurality of intra-file patterns in the template;

detecting a likely presence of malware within a computer file by indicating one or more areas in the computer file based on the portion of the calculated probability distributions of the plurality of intra-file patterns in the template distribution; and in response to detecting the presence of malware in the computer file, performing a security action to protect the computing device from the malware.

14. The computing device of claim 13, wherein the security action comprises one or more of:
blocking a download of the computer file;
warning a user about the computer file;
preventing the computer file from performing any actions on the one or more computing devices;
alerting an administrator to the potential maliciousness of the computer file;
quarantining the computer file; and
deleting the computer file.

15. The computing device of claim 13, wherein the indicating comprises:
searching the computer file to find patterns matching intra-file patterns having calculated probability distributions in the template distribution above the threshold; and
highlighting the found patterns as the one or more areas in the computer file.

16. A non-transitory computer-readable medium having instructions stored thereon which, when executed by a processor of a computing device, perform operations for detecting malware, the operations comprising:
receiving a reference dataset comprising a first aggregation of probability distributions of a plurality of intra-file patterns for a plurality of files of at least a first class and a second aggregation of probability distributions of the plurality of intra-file patterns for a plurality of files of at least a second class, wherein the first aggregation of probability distributions includes a probability for each of the plurality of intra-file patterns of occurring in the plurality of files of at least the first class and the second aggregation of probability distributions includes a probability for each of the plurality of intra-file patterns of occurring in the plurality of files of at least the second class;

applying, to the reference dataset, a logical query that combines the first class with the second class by using one or more probabilistic logical operators to combine, for each of the plurality of intra-file patterns, the respective probability from the first aggregation with the respective probability from the second aggregation to generate a template distribution with probability distributions of the plurality of intra-file patterns calculated according to the one or more probabilistic logical operators in the logical query such that the template distribution includes a probability for each of the plurality of intra-file patterns of occurring in the combined first and second class;

applying at least one threshold to the template distribution to determine at least a portion of the calculated probability distributions of the plurality of intra-file patterns in the template;

detecting a likely presence of malware in a computer file by indicating one or more areas in the computer file based on the portion of the calculated probability distributions of the plurality of intra-file patterns in the template distribution, the one or more areas corresponding to a likely presence of malware in the computer file; and in response to detecting the presence of malware in the computer file, performing a security action to protect the computing device from the malware.

17. The computer-readable medium of claim 16, wherein the security action comprises one or more of:
blocking a download of the computer file;
warning a user about the computer file;
preventing the computer file from performing any actions on the one or more computing devices;
alerting an administrator to the potential maliciousness of the computer file;
quarantining the computer file; and
deleting the computer file.

* * * * *